United States Patent [19]
Koga et al.

[11] Patent Number: 5,083,504
[45] Date of Patent: Jan. 28, 1992

[54] DRINK EXTRACTION APPARATUS

[75] Inventors: Koji Koga, Oashi; Satoshi Wakui, Konosu; Kiyoshi Sakai, Saitama, all of Japan

[73] Assignee: Sanyo Electric Co., Ltd., Osaka, Japan

[21] Appl. No.: 498,521

[22] Filed: Mar. 26, 1990

[30] Foreign Application Priority Data

| Mar. 27, 1989 | [JP] | Japan | 1-75739 |
| Apr. 28, 1989 | [JP] | Japan | 1-50396[U] |
| Apr. 28, 1989 | [JP] | Japan | 1-110012 |
| Jun. 19, 1989 | [JP] | Japan | 1-156250 |

[51] Int. Cl.$^5$ ............ A47J 31/32; A23F 5/26
[52] U.S. Cl. ............ 99/302 R; 99/295; 99/299; 99/323.1
[58] Field of Search ............ 99/275, 279, 285, 292, 99/295, 299, 300, 302 R, 302 P, 307, 323.1; 426/433

[56] References Cited

U.S. PATENT DOCUMENTS

| 3,278,087 | 10/1966 | Stasse | 99/302 R |
| 3,423,209 | 1/1969 | Weber | 99/302 R |
| 3,478,670 | 11/1969 | Fuqua | 99/302 R |
| 3,537,384 | 11/1970 | Stauber | 99/302 R |
| 3,570,390 | 3/1971 | Jordan | 99/307 |
| 4,103,603 | 8/1978 | Bergmann et al. | 99/304 |
| 4,353,293 | 10/1982 | Illy | 99/302 R |
| 4,402,257 | 9/1983 | Marotta | 99/307 |
| 4,583,449 | 4/1986 | Dangel et al. | 99/279 |
| 4,966,070 | 10/1990 | Frisch | 99/295 |
| 4,970,948 | 11/1990 | Giannelli | 99/300 |

FOREIGN PATENT DOCUMENTS

| 59-165081 | 11/1984 | Japan . |
| 60-57885 | 4/1985 | Japan . |
| 61-149112 | 7/1986 | Japan . |
| 1-8539 | 3/1989 | Japan . |

*Primary Examiner*—Allan N. Shoap
*Assistant Examiner*—John L. Beres
*Attorney, Agent, or Firm*—Armstrong, Nikaido, Marmelstein, Kubovcik & Murray

[57] ABSTRACT

A drink extraction apparatus utilizing a pump for pumping hot water from a hot-water tank and, through a pumping tube, pouring such hot water onto drink material in a drink material container, and for, upon completion of the extraction, sending into such drink material container pressurized air through such pumping tube to cut dripping from a filter by expelling hot water in the drink material residue, the air being pumped directly from the air intake or pumped into an air tank to pressurize the air.

8 Claims, 13 Drawing Sheets

DRINK EXTRACTION APPARATUS

FIELD OF THE INVENTION

The invention relates to an apparatus for making drink such as coffee or tea by pouring hot water on a drink material in a filtering portion and extract said drink.

BACKGROUND OF THE INVENTION

Commercial drink extraction apparatuses which can make coffee and the like by pouring hot water on a powdered drink material put in a filter (usually made of paper) so that extracted drink drips by its weight, have been widely used since its constitution is simple and it is not costly.

However, this type of apparatus has a disadvantage that it takes too much time, say 3 minutes, for extracting a cup of drink, since the drink is rendered to gravitational force drip. This is a serious problem in the case of an automatic vending machine because it forces the customer to wait for a long time, providing poor service and sales efficiency.

One way to overcome the disadvantage is to improve conventional self-weight filtering method, as shown in Japanese Utility Model Early Publication 60-57885. This prior art discloses a coffee extraction apparatus called "fresh brew coffee extraction apparatus", which employs a piston-cylinder means provided over a filter block for quickly filtering the coffee supplied and mixed with hot water and pressurized in the cylinder.

Another prior art, Japanese Patent Early Publication 61-149112, discloses an extraction apparatus which employs an air pump to provide pressurized air into the extraction chamber containing drink material and hot water so that the extracted drink may be filtered under the pressure of the air in a very short period of time.

Such piston means and air pump have been successful in making short the filtering time needed for the extracting drink from the mixture of the drink material and hot water.

However, the former of these has a disadvantage that it must have extra components such as a driving means for lifting or lowering the piston and a means for removing the used drink material, increasing complexity of the apparatus.

The latter also has another disadvantage that the air pump for generating the pressurized air results in not only complexity but also extra cost.

On the other hand, Japanese Utility Model Early Publication 1-8539 discloses such drink extraction apparatus as extracting the drink material in a filter of a material storing container.

In these apparatuses a pump is used in supplying hot water into a cartridge drink storage container through a discharge pipe and it is usually the case that the upper area of the drink material container is generally larger than the cross section of the discharging pipe, so that the pressurized hot water supplied from the discharge pipe tends to concentrate in the central portion of the container and that extraction is not done uniformly. Furthermore, in order to meet the requirement that the drink is vended in unit of cup, a hot water tank is also used in these apparatuses, as disclosed, for example, in Japanese Utility Model Early Publication 59-165081. Excessive hot water is overflown from the container through an overflow port back into the hot-water tank. However, such tank is hazardous in that the boiling water might overflow from the overflowing port as the water filling the tank is boiled and is expanded or the boiling water showers out in fluctuation.

BRIEF SUMMARY OF THE INVENTION

The invention is intended to solve the disadvantages mentioned above. The primary object of the invention is therefore to provide a drink extraction apparatus that utilizes a pump for sending hot water and for sending air into the drink material storing container just before the completion of the extraction, so that it may provide drink in short time and permit easy removal of the used drink material.

Another object of the invention is to provide a drink extraction apparatus for which a drink material container may be intimately fitted with the hot water discharging port via a holder when it is used but may be easily replaceable after it is used.

A further object of the invention is to provide an efficient drink extraction apparatus that permits uniform extraction of the powdered drink material.

A still further object of the invention is to provide a safe extraction apparatus that may be well controlled thermally and may provide drink without hazardous overflow of boiling water.

In order to attain these objects, the drink extraction apparatus according to the invention for extracting drink through a filter by pouring hot water on a drink material in a drink material container comprises:

a holder set in said drink material container;

a hot-water tank;

a pump for pouring into said drink material container hot water pumped from said hot-water tank through a pumping tube;

an air intake port communicating with said pumping tube;

a valve for opening or closing said air intake port so as to make the pumping tube communicate with the atmosphere;

a control unit for operating said pump in response to the operation of an extraction starting switch, and, during the period of operation of the pump, close the valve in a first mode, but open the valve in a second mode that follows the first mode.

The air intake port communicating with the pumping tube provided between the hot-water tank and the pump serves as a part of a fluid pumping system when the port is closed, since then hot-water may be pumped by the pump from the hot-water tank through the pumping tube and discharged from the outlet into the drink material container by closing the air intake port. As the port is opened, air is taken in by the same pump from the atmosphere after the extraction, the pump serving now as an air pump, sending the air through the pumping tube into the drink material container. The pressurized air will expel water from the used drink material or residue in the container and prevent prolonged dripping of drink from the filter. In other words extraction will be done in a short period of time.

In this case it is desirable to have the holder fixed firmly under the hot-water outlet by a holder fixation means.

Such a fixation means may be formed of a pair of teeth formed on the outer peripheral of the holder and grooves associated with said teeth, so formed inside the inner surface of the fixation means as to hold said holder. With the engagement of the teeth with the grooves of the fixation means it is possible to easily fix the holder firmly.

Further, a guide may be provided under the fixation means for guiding the holder with one of the teeth engaged in the groove and the other tooth rotated along the inner surface of the fixation means until the holder is brought in complete engagement.

Such simple fixation means provides easy and convenient, but yet good fixation of the holder onto the fixation means.

It is also desirable to provide the extraction apparatus with:

a cover having a hot-water passage communicating with said pumping tube, for covering the upper opening of the fixation means;

a packing to be placed in between the upper peripheral of the holder fixed on the fixation means and the lower peripheral of the cover;

a biassing member for acting a biassing force on the holder fixed on the fixation means outwardly of the packing.

Such biassing member forces the holder against the fixation means when the holder is installed in the fixation means, so that holder is engaged therein firmly. In this case the upper edge of the holder is in tight contact with the lower peripheral of the cover, so that sealed contact between the holder and the fixation means is established, preventing leakage of the drink even when pressurized hot water is poured into the drink material container and extraction may be proceeded successfully.

When the extraction is completed and the holder is removed from the fixation means to replace the used drink material container, the biassing member helps the holder detached easily since the member tends to bias the holder outwardly of the packing.

The cover may comprise a hot-water storing chamber for temporarily storing the pressurized hot water from the pump, and a partitioning plate forming the lower surface of the hot-water storing chamber and having a multiplicity of bores for showering the hot water.

With such hot-water storing chamber, it is possible to temporarily store in the chamber the pressurized hot water sent from the pump and to shower the hot water out of the bores over the entire region of the container, thereby allowing the uniform extraction of the drink.

The hot-water tank preferably comprises:

a main tank having a heater therein;

an auxiliary tank communicating with the main tank for showing the level of the water in the main tank;

a first overflow port provided in the auxiliary tank at the level higher than the predetermined highest level of the water in the main tank; and a second overflow port provided in the main tank at a level higher than the first overflow port.

With such overflow port in the auxiliary tank which is communicated with the main tank but is independent thereof, boiling water will not overflow from the main tank but instead overflow safely from the auxiliary tank at a much lower temperature even when the water is boiling in the main tank. The vapor generated in the boiling water and ejected from the second port may be utilized to detect the boiling and to control the tank heater for safety.

The drink extraction apparatus according to the invention for extracting drink through a filter by pouring hot water on a drink material in a drink material container comprising:

a holder set in said drink material container;

a hot-water tank;

an air intake port provided in a pumping tube for leading the hot water pumped from the hot-water tank to a hot-water outlet;

a valve for opening or closing said air intake port so as to make the pumping tube communicate with the atmosphere;

a pump connected with the pumping tube on the intake side of the pump and connected with the drink material container on the hot-water outlet side of the pump;

an air tank port connected with the hot-water outlet via a branching tube;

a switching means for switching the connection of the hot-water outlet between a first state in which the hot-water discharging outlet is communicated with the air tank, a second state in which the hot-water discharging outlet is communicated with the drink material container, and a third state in which the air tank and the drink material container are communicated via the discharging outlet;

a control unit for selecting the first state in a first mode to open the valve, the second state in a second mode to close the valve in response to the extraction initiation signal from a switch, and the third state in a third mode that follows the completion of the extraction, is characterized in that, in the case of the first state, the air tank intakes air from the atmosphere through said branching tube and provides pressurized air to the drink material container.

The drink extraction apparatus having the above constitution may:

intake air from the air intake port by driving the pump with the valve closed and exhausting the air into the pumping tube to thereby storing the pressurized air in the air tank if the switching means is in the first state waiting for next extraction;

pump hot water from the hot-water tank through the pumping tube by driving the pump with the valve opened and discharging from the hot water outlet the hot water into the drink material container if the switching means is in the second state during extraction; and in the third state of the switching means, stop the pump at the end of the extraction and lead pressurized air from the air tank to the drink material container to expel water from the used drink material and prevent dripping from the filter over a long period.

Because of the provision of the switching means and the air tank, it is possible to store pressurized air in the air tank during the intervals between successive extraction, which air may be instantly and effectively supplied to the pumping tube after each extraction operation to thereby shorten time required for the extraction.

BRIEF DESCRIPTION OF THE DRAWINGS

FIG. 13 is also a schematic view of the hot-water tank when the upper limit switch is turned on.

FIG. 14 is another schematic view of the hot-water tank when the lower limit switch is turned on.

DETAILED DESCRIPTION OF THE PREFERRED EMBODIMENT

Figure 1:
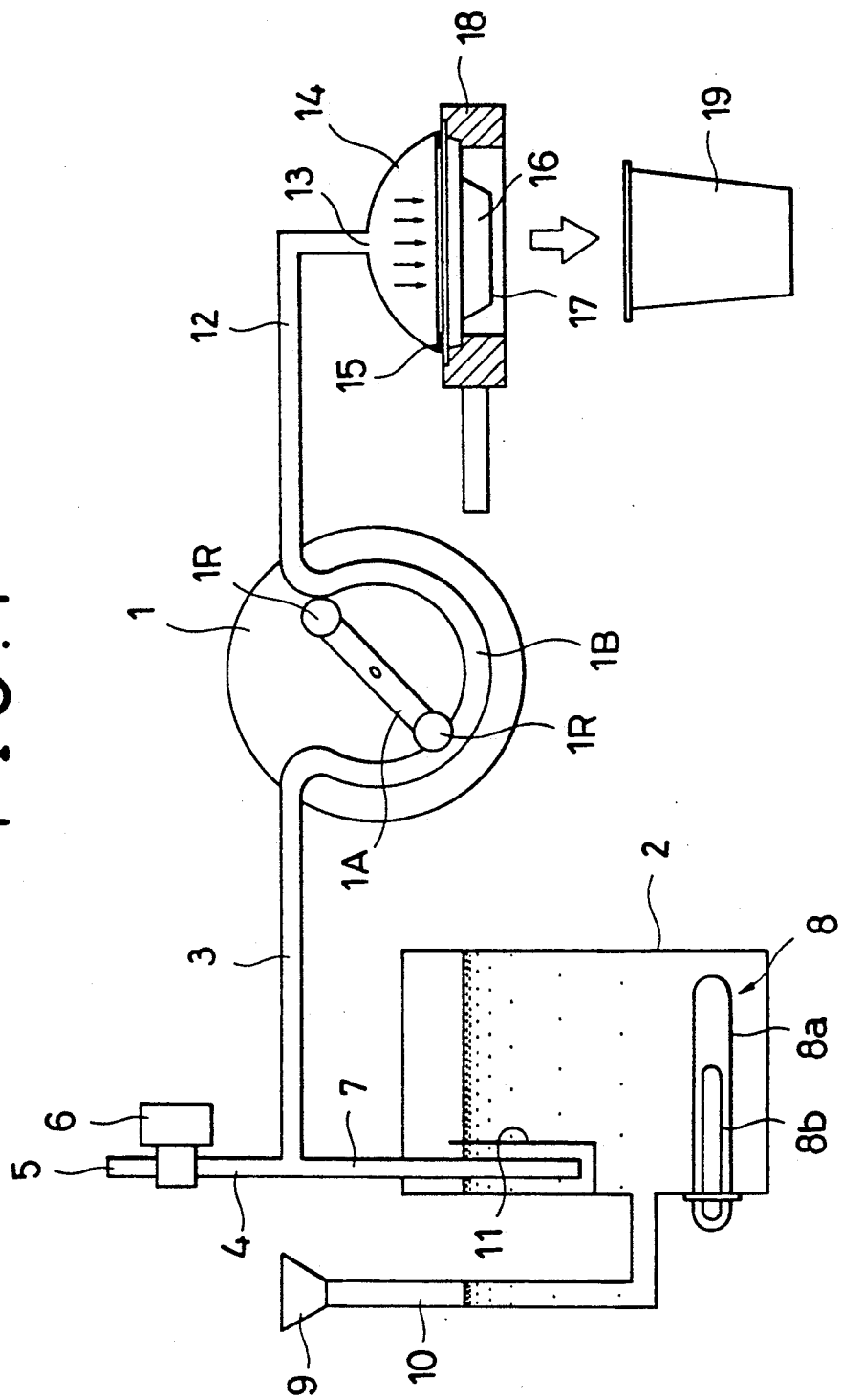
FIG. 1 is a schematic diagram showing the constitution of an exemplary drink extraction apparatus according to the invention.

Referring now to FIG. 1, a first embodiment of the invention is described below. In between the inlet side of a peristaltic pump (1) and a hot-water tank (2) storing hot water is a pumping tube (3) which is communicated with an air intake port (5) via an air pipe (4). The air intake port (5) may be opened or closed by means of an electromagnetic valve (6). When the electromagnetic valve (6) is opened the air intake port (5) is opened to the atmosphere.

On the other hand, when the electromagnetic valve (6) is closed, the water in the hot-water tank (2) is sucked by means of the peristaltic pump (1) through a siphon tube (7) and the pumping tube (3). The hot-water tank (2) is provided with a heater (8) which consists of a large capacity heater (8a) and a small capacity heater (8b) at the inner bottom of the tank. On the side of the tank is an auxiliary tank (10) having at its upper end a water faucet (9) for replenishing water in the tank. The connection of the auxiliary tank (10) to tank (2) will be described in detail later.

In order to prevent bubbles in the boiling water from being sucked into the siphon tube (7), a bubble prevention plate (11) is provided in the tank (2).

The peristaltic pump (1) is provided with a rotor (1A) having on its opposite ends rollers (1R) which rolls on a resilient tube (1B) so as to push the fluid in the tube downstream.

The peristaltic pump (1) is connected on its outlet side with a discharging tube (12), the far end of which is in turn connected with a top hot-water inlet (13) of a cap-shaped cover (14). The drink material container (16) is tightly mounted on the lower periphery of the cover (14) via a packing (15). The drip material container (16) has a filter (17) at its bottom and contains ground coffee therein. The extracted drink through the filter (17) is received by a cup (19). The drink material container (16) is furnished in a form of replaceable cartridge to be mounted on a holder (18) as described later.

The peristaltic pump (1) is communicated with either the hot-water tank or the atmosphere through the pumping tube (3) in accordance with the condition of the electromagnetic valve (6). Namely, by means of the peristaltic pump hot water is pumped from the hot-water tank through the siphon tube (7), pumping tube (3) and to the drink material container (16) via the discharging tube (12), the hot-water outlet (13) of the cover (14) when the electromagnetic valve (6) is closed, while air is sucked from the air intake port (5) through the air intake tube (4), pumping tube (3) and sent to the drink material container (16).

The hot water thus discharged into the drink material container (16) is mixed with the ground coffee. The mixture is filtered with a filter (17) so as to provide liquid coffee in the cup. The residue is left on the filter (17). As the peristaltic pump (1) has pumped the amount of hot water required for one cup, the electromagnetic valve (6) is opened to intake air from the air intake port (5). The air is injected into the drink material container for a predetermined period required to expel the water in the residue so that dripping is completed. At the end of this period the peristaltic pump (1) is stopped, when the extraction is over and the used cartridge or the drink material container (16) is replaced by a new one for the next extraction.

Figure 2:
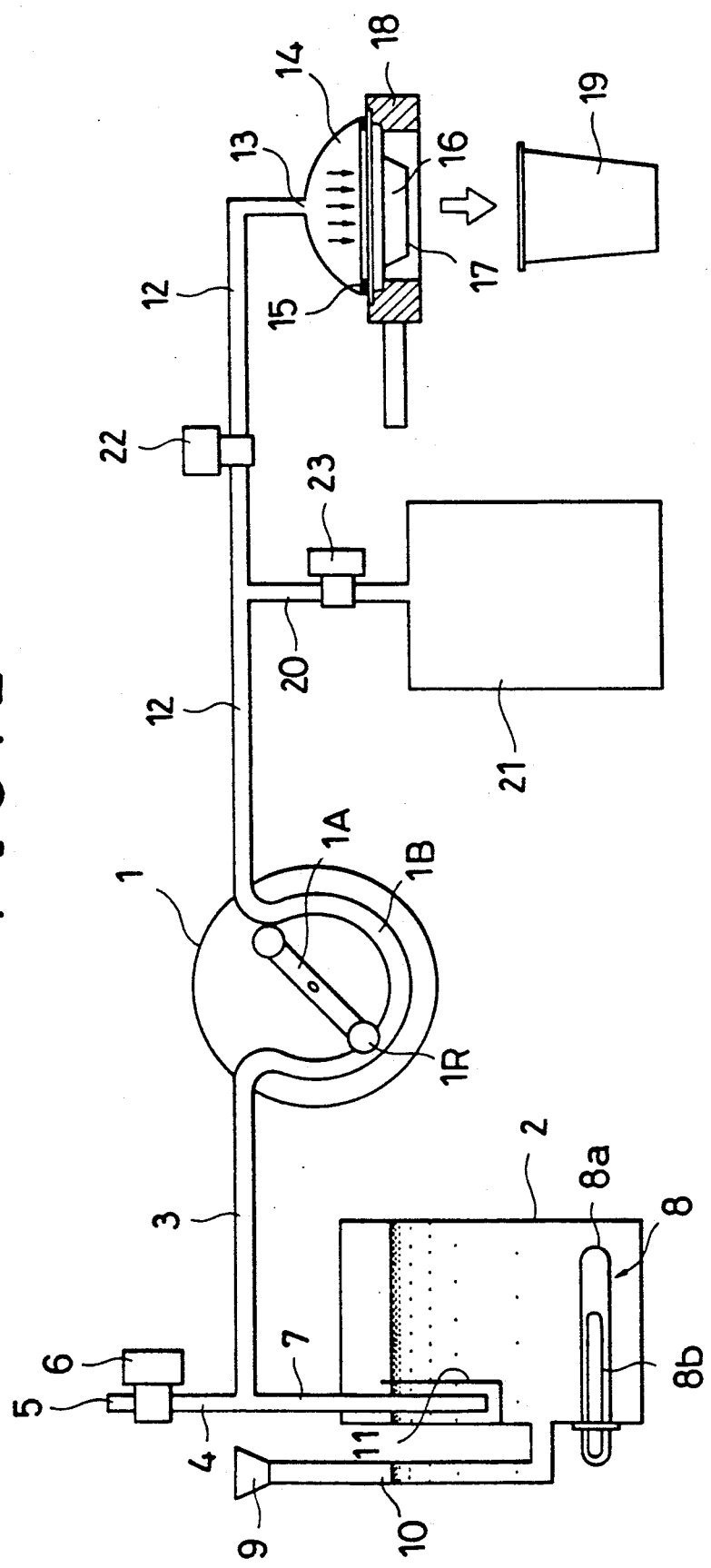
FIG. 2 is a schematic diagram showing the constitution of another exemplary drink extraction apparatus according to the invention.

The invention is further described by way of a second example with reference to FIG. 2, in which the same or equivalent components as their counterparts in FIG. 1 are given the same numbers. However, the drink extraction apparatus shown in FIG. 2 has, in addition to the one of FIG. 1, such components as a branching tube (20) branching from the discharging tube (12), an air tank (21) for accommodating the pressurized air supplied from the branching tube (20), and a first and a second two-way valve (22)(23), respectively, that constitute a switching means.

In this constitution, the peristaltic pump (1) intakes air from the air intake port (5) through the air intake tube (4) and the pumping tube (3), and discharges it into the air tank (21) through the discharging tube (12) and the branching tube (20) when the electromagnetic valve (6) is opened waiting for an order of extraction. In this case the first two-way valve (22) is closed, while the second two-way valve (23) is opened. The air discharged from the peristaltic pump (1) is, therefore, led into the air tank (21) and stored therein until a pressure sensor (not shown) alarms that the pressure in the tank has reached a predetermined level to stop the pumping.

During the extraction operation, the electromagnetic valve (6) is closed, so that the peristaltic pump (1) pumps hot water from the hot-water tank (2) through the pumping tube (3). In this case the first two-way valve (22) is opened while the second two-way valve (23) is closed. As a result the hot water discharged from the peristaltic pump (1) is pumped to the drink material container (16) via the discharging tube (12). The hot discharged water is mixed with the ground coffee in the container (16). The mixture is filtered with a filter (17) so as to separate liquid coffee from the residue. The coffee is led into the cup (19) while the residue is left on the filter (17).

As the peristaltic pump (1) has pumped the amount of hot water required for one cup of coffee into the drink material container (16), the electromagnetic valve (6) is opened to return the hot water remaining in the pumping tube (3) back into the hot-water tank (2), when the peristaltic pump (1) is stopped.

Next, both the first and the second two-way valve (22)(23), respectively, are opened to lead the pressurized air in the air tank (21) into the drink material container (16), the pressurized air prompting filtering the mixture of the ground coffee with the hot water and finish filtering by expelling the water remaining in the residue on the filter (17). At the end of a predetermined period required for expelling the water, both two-way valves (22)(23) are opened. In this case, the air discharged from the air tank (21) will not return to the peristaltic pump (1), since the pump is stopped then. The air will be instead led to the drink material container (16). The extraction for the cup is finished at this moment. The cartridge container (16) is then replaced by a new one for the next extraction.

It would be noted that depending on the capacity of the air tank, charging the air tank (21) with pressurized air may be carried out each time of extraction.

It should be apparent that the peristaltic pump may be substituted for by any pump such as a bellows pump or an electromagnetic pump so long as it may pump air and hot water. The switching mean above, which utilizes two two-way valves, may be substituted for by, for example, a three way valve or three-way cock connected with the branching tube (20) and the discharging tube (12).

The drink material container (16) may be a non-dispensable type of container serving as an extraction chamber that allow replacement of coffee only.

Figure 3:
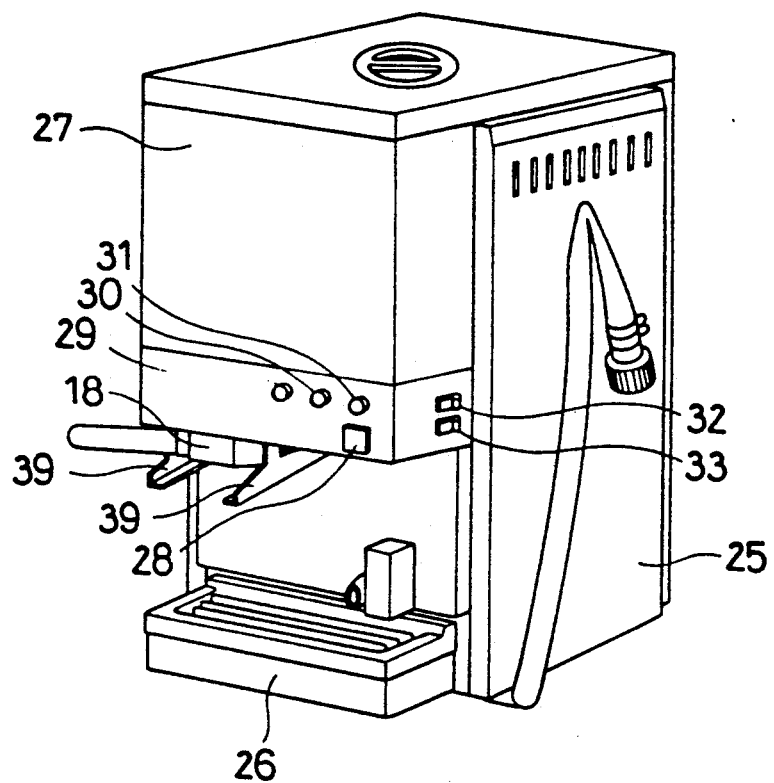
FIG. 3 is a perspective view of a drink extraction apparatus having a constitution of FIG. 1 or FIG. 2.
Figure 4:
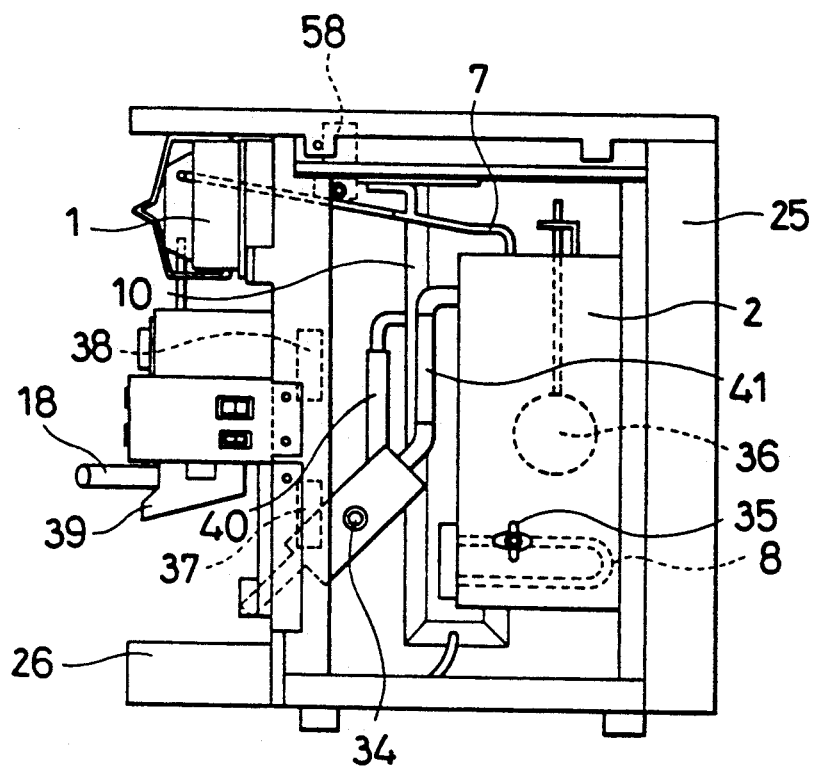
FIG. 4 is a transverse cross section of the drink extraction apparatus.

The drink supply unit e.g. a coffee server, equipped with one of the above drink extraction apparatuses is provided with a hot-water tank (2) inside and at the rear portion of the body (25) and a tray (26) for supporting the cup (19) for receiving the extracted drink, as shown in FIGS. 3 and 4. The peristaltic pump (1) is housed in the front portion (27) facing the tray (26) together with a switch (28) for starting extraction, a lamp (29) indicative of supplying water, an "on-sale" lamp (30), and a lamp (31) indicative of extraction. On the side of the front portion (27) are a power switch (32) and a switch (33) for a fluorescent lamp. On the underside of the front portion (27) is a holder guide member (39) for guiding a holder (18) when the holder loaded with the drink material container is mounted on the body (25).

The hot-water tank (2) is provided with an overflow tube (40) for allowing overflowing water at the time of water supply, and an overflow tube a vapor relief tube for relieving vapor pressure when the water is boiling. The vapor relief tube (41) has a thermostat (34) for preventing boiling.

A thermostat (35) is provided at a suitable height in the hot-water tank (2) for preventing heating the tank empty, serving as a safety device together with a thermostat (34). A float (36) inserted in the hot-water tank (2) may control electricity through the heater (8) and a lamp (29) indicative of water supply by turning on or off a lower limit switch and an upper limit switch (not shown in the Figures) as it moves up or down. In the tank is provided a detector for detecting the temperature of the tank water, a thermostat (37) for turning on a large-capacity heater (8a) when the temperature is too low, for example, immediately after water supply, and a thermostat having a detector on the surface of a vapor relief tube (41) for optimizing the water temperature by turning on and off a small capacity heater (8b). Near the top of the body (25) is an electromagnetic valve (58) for draining the hot water.

Figure 5:
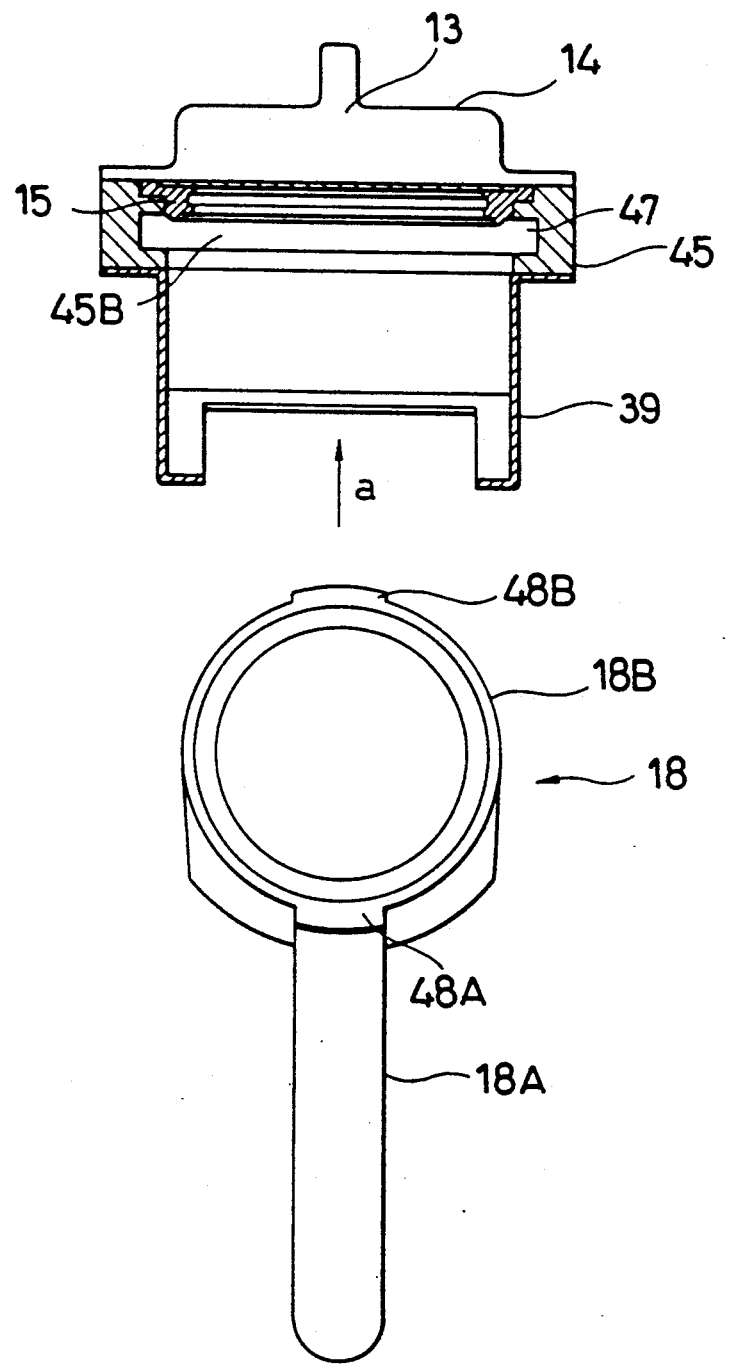
FIG. 5 is a front view of the drink extraction apparatus, with its portion removed to show how the holder is fitted into the fixation means.

As shown in FIGS. 5 through 9, the holder (18) which is detachable from the body (1) comprises a handle (18A) and an annular portion (18B) (FIG. 5). The drink material container (16) is placed in the hollow portion of the annular portion (18B). The drink material container (16) is a cartridge so formed as to easily fit in the annular portion (18B). The container has a filter at the bottom and contains drink material. The holder (18), holding therein the drink material container (16), is mounted on a fixation mean (45) secured on the body (25).

Figure 9:
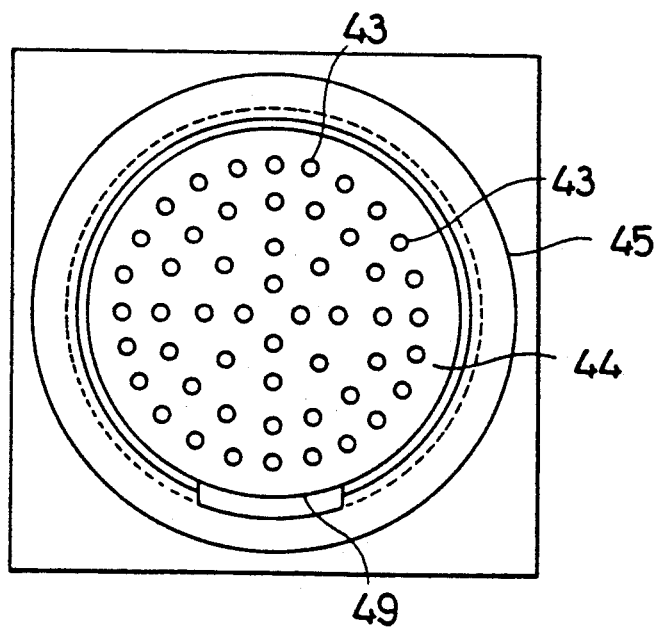
FIG. 9 is a view of the hot-water supply system having a multiplicity of bores and the holder taken from the bottom thereof, showing the relationship between them.

The cover (14) for covering the top opening of the fixation means (45) has a hot-water storing chamber (42) for temporarily storing the hot water supplied from the peristaltic pump (1). The lower surface of the storing chamber (42) is formed of a partitioning plate (44) having a multiplicity of hot-water ejection bores (43), as shown in FIG. 9.

With such hot-water storing chamber (42) and ejection bores (43) in the partitioning plate (44), the pressurized hot water discharged into the discharging tube (12) is ejected from the discharging outlet (13) into the hot-water storing chamber (42), stored therein temporarily, and thereafter ejected uniformly over the entire region of the drink material container (16).

Consequently, even if the peristaltic pump (1) provides pulsed hot water, an almost constant rate of hot water is poured onto the ground coffee in the drink material container (16), allowing efficient extraction of the drink.

After the extraction, on the other hand, the air sucked by the peristaltic pump (1) and sent to the cover (14) is also ejected evenly from the ejection bores (43), so that it expels the water in the remaining residue on the filter (17) of the container (16), thereby cutting dripping from the filter (17) and finishing extraction in a short period.

The holder (18) may engage with the fixation means (45) in such a way that the outer edge of the holder mates the inner peripheral of the fixation means and that the upper edge abuts tightly on the packing (15) mounted on the periphery of the partitioning plate (44). The configuration and the function of the holder are described in detail below.

The fixation means (45) has a hollow portion (45B) having approximately the same size as the outer peripheral of the annular portion (18B), and a projecting portion (46) on its inner surface, thereby forming a groove (47) which will face the outer peripheral of the annular portion (18B) of the holder (18) when the holder is mounted. The groove (47) securely engages with a pair of teeth (48A, 48B) formed on the outer periphery of the holder (18). The teeth (48A, 48B) are formed on opposite sides of the holder (18) so that, as the holder is inserted into the body (1) in the direction of arrow "a", they come to positions across the hollow portion (45B), and that the tooth (48A) meets the handle (18A). The fixation means (45) lacks projecting portion (46) in the region where the holder would otherwise interfere therewith as the holder is inserted into the groove (47) along the arrow "a", as shown in FIG. 9. Below the fixation means (45) is provided a guide member (39) for guiding the holder (18) in the fixation means. The guide member (39) has a surface which contact the lower end of the holder (18). This surface is inclined in such a way that the tooth (48B) engages with the groove (47) as the holder is slipped on the surface in the direction of arrow "a".

A spring (50) is provided on the partitioning plate (44) of the cover (14) for biassing the drink material container set in the holder (18) downward when the container is mounted in the fixation means (45).

This spring (50) provides a force to separate the drink material container (16) and the holder (18) from the packing (15) easily when it is removed from the fixation means (45) after the completion of extraction.

Figure 6:
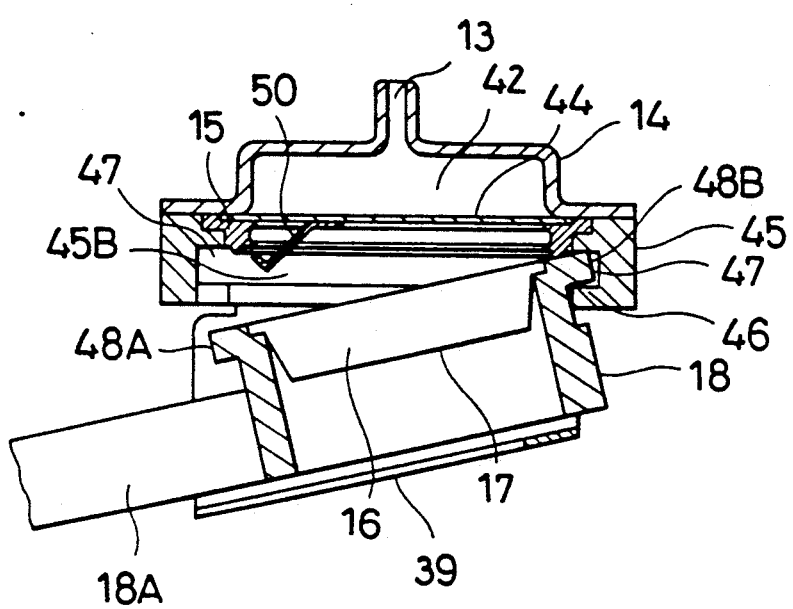
FIG. 6 is a cross section of the drink extraction apparatus, showing the initial state of fixing the holder in the fixation means.
Figure 7:
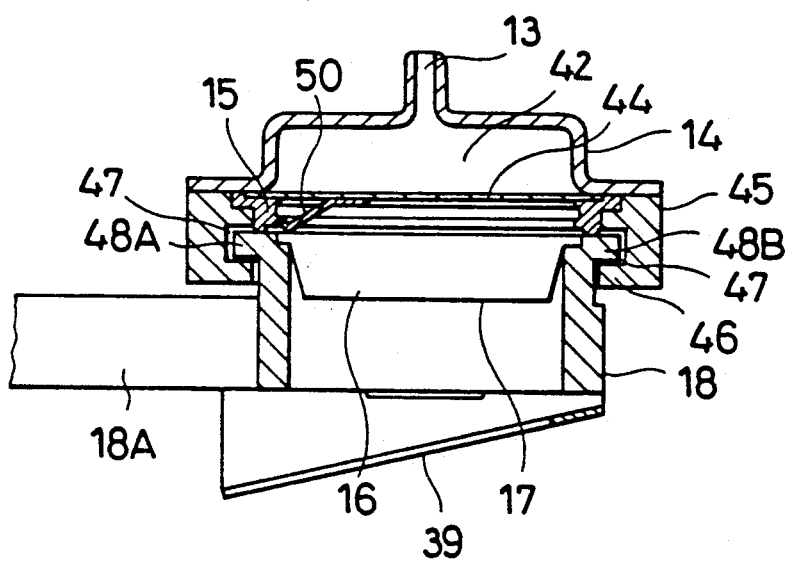
FIG. 7 is a cross section of the drink extraction apparatus, showing the state of the holder fixed in the fixation means under the biassing force of a biassing means.
Figure 8:
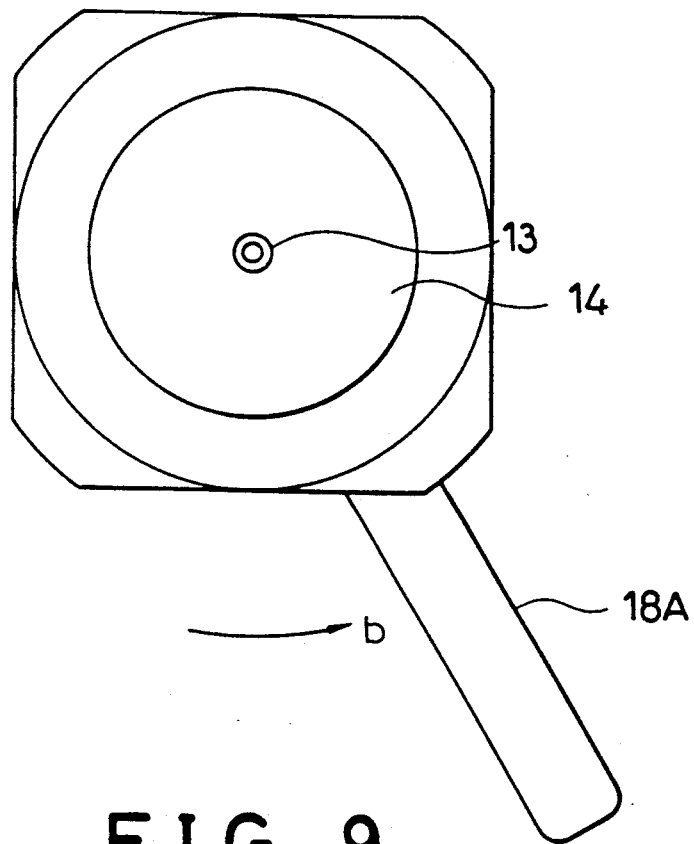
FIG. 8 is a plan view of the hot-water supply system with the holder installed therein.

In mounting the holder (18) on the fixation means (45), the holder (18) is placed on the guide member (39) (FIG. 5) and is forced in the direction of arrow "a". The holder is thus moved on the slant surface of the guide member (39) until the tooth (48B) engages with the groove (47) (FIG. 6). With the tooth of the holder (18) hooked on the groove, it may be lifted upward against the downward biassing force of the spring (50) acting via the drink material container (16) to force the tooth (48A) into the hollow portion (45B) of the fixation mans (45) so that the holder (18) engages with the fixation means (45) (FIG. 7). As the handle portion (18A) is turned in the direction of arrow "b" (as shown in FIG. 8), the tooth (48A) is also forced into the groove (47) making a complete engagement between the holder (18) and the fixation means (45). The teeth (48A, 48B) are both latched in the groove (47) with supporting projection (46), and are tightly sealed by a packing (15). Namely, the groove (47) and the teeth (48A, 48B) together provide engagement of the holder (18) with the fixation means (45) under the resistive force of the spring (50).

When the extraction switch (28) is turned on with the holder (18) in position on the body (25), the peristaltic pump (1) is started, hot water from the hot-water tank (2) is siphoned through the siphon tube (7) and the pumping tube (3), which water is sent with pressure to the drink material container (16) through the discharging tube (12), discharging outlet (13) of the cover (14). This peristaltic pump (1) comprises a rotatable roller (1A) that rolls on a resilient tube (1B) to squeeze the liquid in the tube. The hot-water sent into the drink material container (16) is then mixed with the drink extraction material, passed through the filter (17), supplying extracted drink in a cup (19).

The removal of the holder (18) for replacement of the drink material container (16) may be done in the reverse order to its mounting. As the holder (18) is dismounted from the fixation means (45) by disengaging the tooth (48A) with the groove (47), the drink material container (16) is separated from the packing (15) with the help of the biassing force of the spring (50). Thus, even if the pressure inside the tubes is negative, the drink material container (16) and hence the holder (18) may be easily dismounted from the fixation means (45), making easy the replacement of the drink material container (16).

Figure 10:
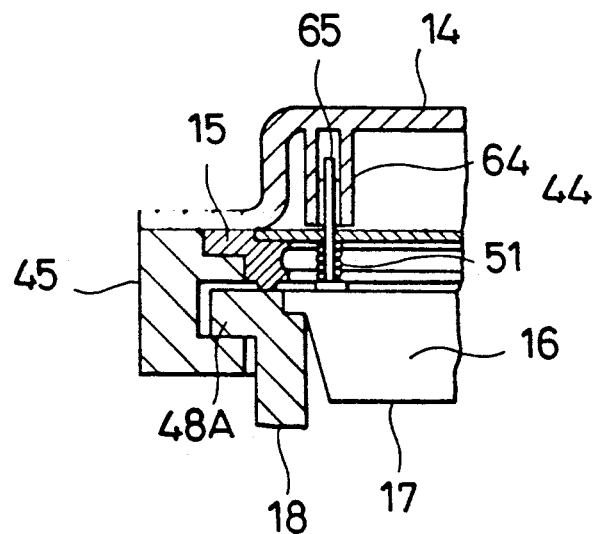
FIGS. 10 and 11 are fragmentary cross sectional views of the holder and the fixation means having another type of biassing means, showing the initial condition of the holder at the time of installation and the final condition of the holder fixed in the fixation means.
Figure 11:
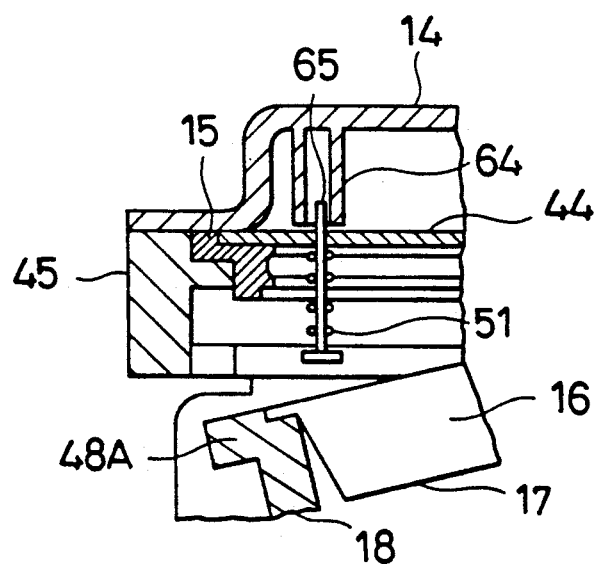

FIGS. 10 and 11 illustrate how the compression spring (51) is used. A shaft (65) is slidably installed in shaft hole (64) with a predetermined stroke, forcing down the drink material container (16) by means of the compression spring (51) when the holder (18) is engaged with the fixation means (45).

A cushion (not shown) may be alternatively mounted on the holder (18) for such biassing spring.

Figure 12:
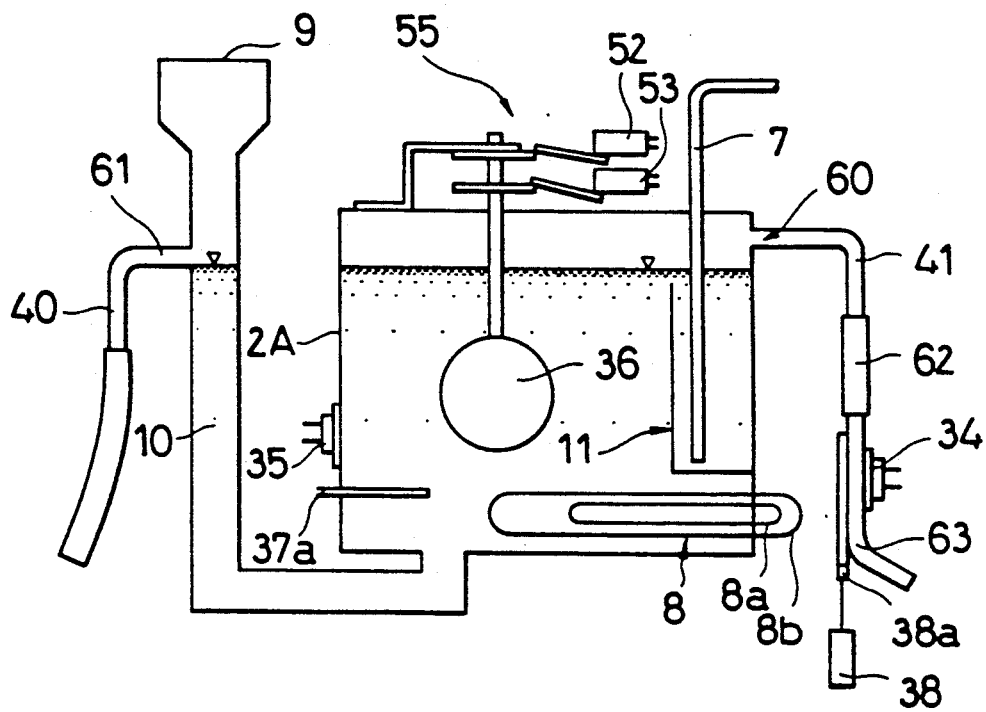
FIG. 12 is a schematic view of the hot-water tank.
Figure 13:
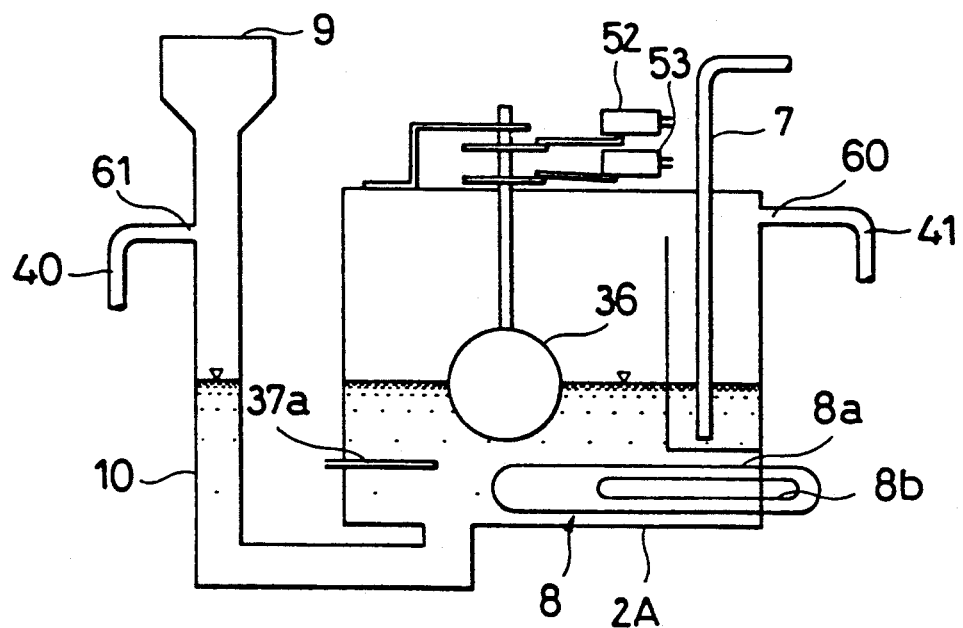
Figure 14:
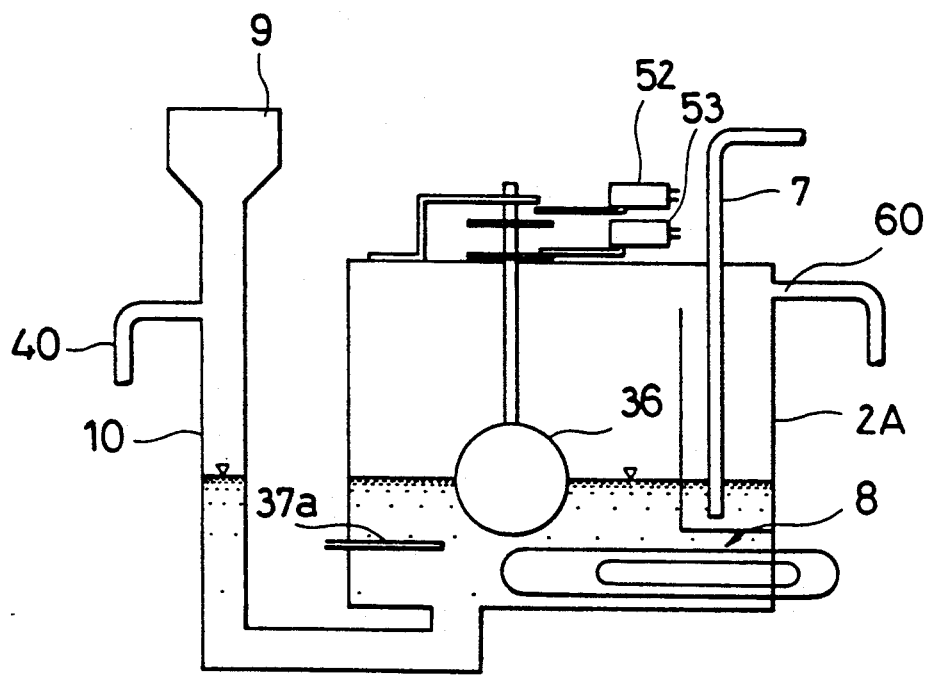

The constitution of the hot-water tank (2) is now described. As shown in FIGS. 12 through 14, hot water in the body of the hot-water tank (2A) having heaters (8a, 8b) is pumped by a peristaltic pump through the siphon tube (7). In the main tank (2A) is a sensor (37a) for detecting, and making optimum, the temperature of the water. A water level detector (55) having the float (36) may move up and down in accordance with the level of the water in the main tank (2A) to turn on or off the upper and lower limit switches (52)(53), respectively. The upper limit switch (52) is adopted to issue warning signal for water supply when the water level lowers to the level shown in FIG. 13. The lower limit switch (53) is meant to control heaters (8a, 8b). Namely, when the water level reaches the level shown in FIG. 14, a little higher than the heaters (8a, 8b) and the sensor (37a), these heaters (8a, 8b) are turned off. In a pipe (63) connected via a silicon tube (62) to an overflow port (60) at an upper portion on the main tank (2A), a thermostat (34) is provided for controlling on-off of the heaters (8a, 8b) so as to prevent overheating of the tank water.

Specifically, the thermostat (34) controls the electricity for the heaters (8a, 8b) through their hystereses in the range of 50° C.–70° C. A sensor (38a) for the temperature thermostat switch (38) is mounted on the surface of the pipe (63).

Figure 15:
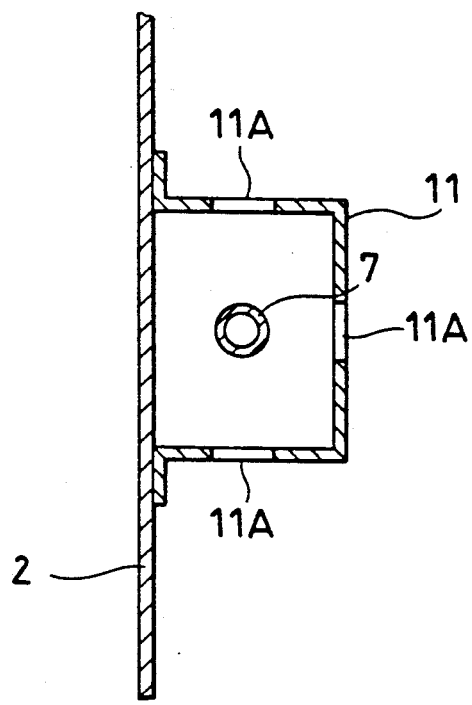
FIG. 15 is a transverse cross section of the portion having a bubble-prevention panel.

An auxiliary tank (10) having a water supply port (9) communicate with the bottom of the hot-water main tank (2A), having the same water levels. The bubble prevention plate (11) in the hot-water main tank (2A) is provided with bores (11A) as free passages for the hot water, as shown in FIG. 15. Another overflow port (61) is also provided on the auxiliary tank (9), at a height higher than the standard water level of the hot-water tank (2A). The overflow port (60) of the hot-water tank (2A) is still higher than the overflow port (61). The standard water level is so set as not to overflow from the overflow port (61) of the auxiliary tank (10) if the water is heated and expanded. As the stored hot water in the hot-water main tank (2A) is used to the extent that the lower limit switch (53) transmits alarming signal e.g. flashing of a lamp or alarming sound, a maintenance personnel may supply a predetermined amount of water from the water supply port (9) to recover the standard water level in the main tank (2A).

As the vapor flows into the overflow port (60) at the time of boiling, the thermostat (34) functions to stop the electricity to the heaters (8a, 8b), thereby preventing continued boiling of the water in the tank.

If, however, water is supplied excessively over the standard water level and is boiled, it might overflow from the overflow port (61) due to expansion. However, the temperature of the overflowing water is at most safe 50° C.–60° C., since the auxiliary tank (10) has no heater. Since the overflow port (60) is located higher than the overflow port (61), no boiling water will flow from this port. Only vapor will come out from the overflow port (60). This permits the operation of the thermostats accurate in controlling the heaters (8a, 8b).

The control circuitry is now described. As shown in FIG. 15, a control unit (C) is connected across the power lines (L1, L2) together with the water supply lamp (29) which is turned on by the switch (52) when the water level in the tank is lowered below the upper limit, informing the operator to supply necessary amount of water from the auxiliary tank (10).

The power lines (L1, L2) are also connected with the lower limit switch (53), the thermostat (34) for preventing boiling, (35) for preventing heating empty tank, (37) for obtaining optimum water temperature in series. The sensor (37a) of the temperature optimization thermostat

(37) is installed in the hot-water tank (2), switches from H contact to L contact as the temperature of the water exceeds about 98° C. The 1 kW heater (8a) is powered from the lines (L1, L2) through H contact when the water level in the hot-water tank (2) is above the lower limit with the lower limit switch (53) turned on, boiling prevention thermostat (34) and the empty heating prevention thermostat (35) operating in normal condition, and the temperature of the hot water being less than 98° C. Therefore, when the water in the tank is not hot enough for making drink, the high power heater is turned on to heat the water quickly.

The ON-SALE lamp is connected to the power via the L contact of the temperature optimization switch. Therefore, it is turned on when the water level in the tank is above the lower limit level, the lower limit switch is on, the thermostats for preventing boiling and for heating empty tank are operating normal, and the temperature of the tank water is 98° C. or more.

The 400 W heater, connected in parallel with the ON-SALE lamp, is connected with the L contact of the temperature optimization thermostat. The temperature sensor of the optimization thermostat is mounted on the surface of the pipe (12). If the water boils and the vapor comes into the pipe (12), causing the temperature of the surface to exceed about 60° C., the switch is turned off since the temperature optimization thermostat (38) turns off. Thus, the 400 W heater is turned on only when the water level in the tank is higher than the lower limit, with the lower limit switch (53) being turned on, the thermostats (34)(35) operating normal, and the water in the tank not boiling.

The extraction starting switch (28) and the extraction lamp (31) are connected in series with the power lines (L1, L2) via the lower limit switch (53), so that the extraction lamp (31) is lit as the extraction switch (28) is turned on when the water level in the tank (2) above the lower limit. The extraction starting switch (28) is also connected with the control unit which controls in response to the ON signal from the switch the extraction operation.

The control unit have terminals 1 and 4 connected with the power lines (L1, L2), terminal 2 is connected with the extraction switch (28), terminals 3 6 with a hot-water drainage electromagnetic valve (58), terminal 5 with a pump motor (1M). The control unit comprises a timer for controlling, in response to the pump motor (1M), operation of the hot-water drainage electromagnetic valve (58).

Figure 16:
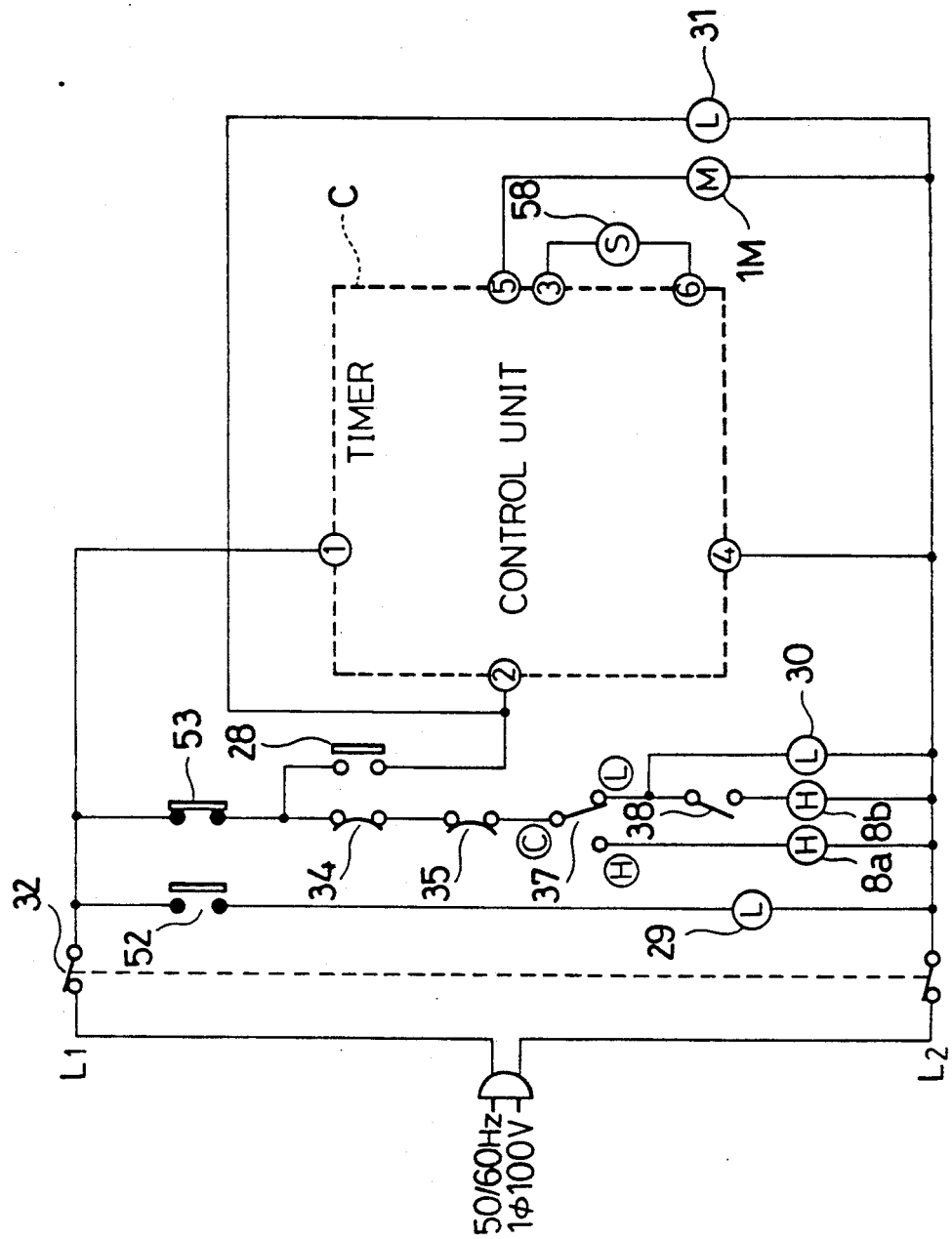
FIG. 16 is a circuitry for the drink extraction means.
Figure 17:
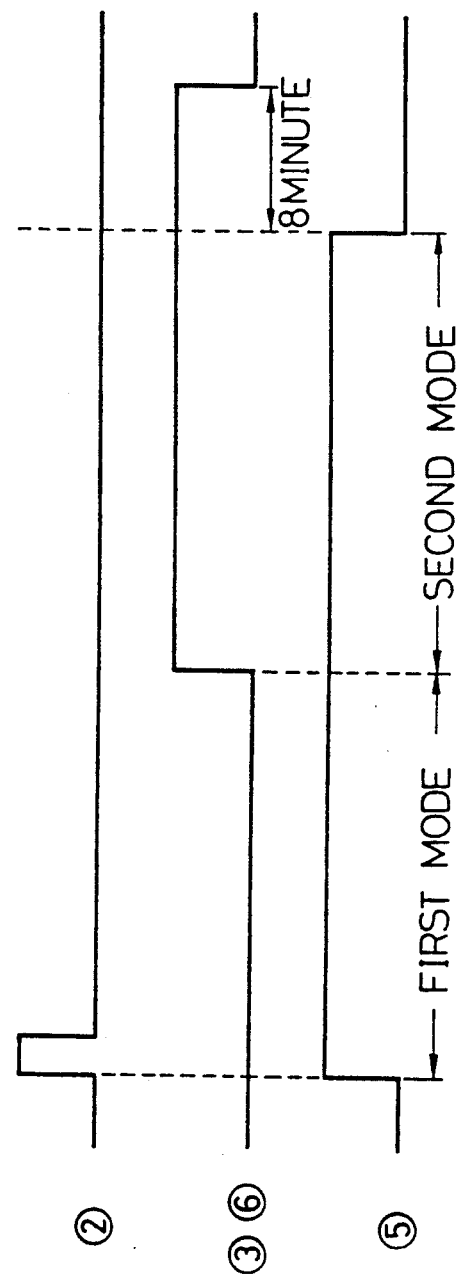
FIG. 17 is a timing chart showing the operation of the control unit of the drink extraction apparatus.

FIG. 16 illustrates a timing chart for the control unit. Referring to this figure, the operation of the extraction apparatus is described.

Upon the signal, indicative of the turn-on of the extraction switch (28), is transmitted into the terminal 1, the control unit transmits driving signals from the terminal 5 to the pump motor (1M) for 25 seconds. On the other hand, the control unit makes the hot-water drainage electromagnetic switch (58) opened 12 second after the extraction switch (28) was turned on. The operation over this 12 second is called first mode, in which the pump motor (1M) is in operation with the hot-water drainage electromagnetic switch (58) closed, providing the hot water pumped into the drink material container. The second mode of the operation starts 12 second after the turn-on of the extraction switch (28) and ends when the pump motor (1M) is stopped. In this mode air blowing operation, or the drainage of hot water through the electromagnetic valve (58) and passing of air through the tubes, is carried out.

Although the extraction is terminated by the stopping of the pump motor (1M), drainage is continued by keeping the electromagnetic valve (58) open for another 8 minutes in this example. The reason for this is as follows. Although the tubes have been warmed by the passing of the hot water, they will be cooled with time if the hot-water drainage electromagnetic valve (58) is closed immediately, lowering the pressure inside the tubes. This negative pressure will draw the water from the hot tank into the pumping tube (3). This water, however, will remain in the tube to cool off and mix with the hot water for the next extraction in the drink material container (16). Thus, if the electromagnetic valve is kept open after the completion of the extraction, such drawing of the water as mentioned above will not take place, since the pumping tube (3) is open to the atmosphere. Incidentally, the control unit is programmed so that the hot-water drainage electromagnetic valve (58) is closed to resume the control of the extraction if the extraction is instructed by the extraction starting switch (28) during the drainage by the valve (58).

We claim:

1. A drink extraction apparatus for extracting drink through a filter by pouring hot water on a drink material in a drink material container comprising:
    a holder for receiving said drink material container;
    a hot-water tank;
    a pump for pouring into said drink material container the hot water pumped from said hot-water tank through a pumping tube;
    an air intake port communicating with said pumping tube;
    a valve for opening said air intake port so as to make the pumping tube communicate with the atmosphere;
    a control unit for operating said pump in response to the operation of an extraction starting switch, and, during the period of pumping operation, for closing the valve in a first mode but opening the valve in a second mode that follows the first mode.

2. A drink extraction apparatus according to claim 1, further comprising a fixation means for firmly holding said holder.

3. A drink extraction apparatus according to claim 2, wherein said holder includes a pair of teeth formed on the outer periphery thereof and said fixation means includes a groove formed therein, said groove being so formed inside the inner surface of the fixation means for engaging said teeth to thereby hold said holder.

4. A drink extraction apparatus according to claim 3, wherein said apparatus further comprises a guide provided under the fixation means for guiding the holder with one of the teeth engaged in the groove and the other tooth rotated along the inner surface of the fixation means until the holder is brought in complete engagement.

5. A drink extraction apparatus according to claim 2, further comprising:
    a cover having a hot-water inlet in communication with said pumping tube and for covering the upper opening of the fixation means;
    a packing to be placed in between the upper peripheral of the holder fixed on the fixation means and the lower peripheral of the cover;

a biassing member for acting a biassing force on the holder fixed on the fixation means outwardly of the packing.

6. A drink extraction apparatus according to claim 5, wherein said cover comprises a hot-water storing chamber for temporarily storing the pressurized hot water from the pump, and a partitioning plate forming the lower surface of the hot-water storing chamber and having a multiplicity of bores for showering the hot water.

7. A drink extraction apparatus according to claim 1, wherein said hot-water tank comprises:
- a main tank having therein a heater;
- an auxiliary tank communicating with the main tank for showing the level of the water in the main tank;
- a first overflow port provided in the auxiliary tank at the level higher than the predetermined highest allowable level of the water in the main tank; and
- a second overflow port provided in the main tank at a level higher than the first overflow port.

8. A drink extraction apparatus for extracting drink through a filter by pouring hot water on a drink material in a drink material container comprising:
- a holder for receiving said drink material container;
- a hot-water tank;
- an air intake port in a pumping tube for leading the hot water from the hot-water tank to a hot-water outlet:
- a valve for opening said air intake port so as to make the pumping tube communicate with the atmosphere;
- a pump whose intake is connected with the pumping tube of the pump and hot-water outlet is connected with the drink material container;
- an air tank port connected with the hot-water outlet via a branching tube;
- a switching means for switching the connection of the hot-water outlet from one to the other of three states; a first state in which the hot-water discharging outlet is communicated with the air tank, a second state in which the hot-water discharging outlet is communicated with the drink material container, and a third state in which the air tank and the drink material container are communicated via the discharging outlet;
- a control unit for selecting the first state in a first mode to open the valve, the second state in a second mode to close the valve in response to the extraction initiation signal from a switch, and the third state in a third mode that follows the completion of the extraction,
characterized in that, in the case of the first state, the air tank intakes air from the atmosphere through said branching tube stores it in a pressurized condition, and provides pressurized air to the drink material container in the third state.

* * * * *